United States Patent [19]

Keller et al.

[11] 3,801,965

[45] Apr. 2, 1974

[54] WRITE SUPPRESSION IN BIPOLAR TRANSISTOR MEMORY CELLS

[75] Inventors: Guenter Keller, Boeblingen; Ulrich Olderdissen, Sindelfingen, both of Germany

[73] Assignee: International Business Machines Corporation, Armonk, N.Y.

[22] Filed: Feb. 9, 1972

[21] Appl. No.: 224,729

[30] Foreign Application Priority Data

July 16, 1971 Germany............................ 2135625

[52] U.S. Cl....340/173 R, 340/173 FF, 340/174 AC, 340/174 GA, 340/174 TB, 307/238

[51] Int. Cl............................................... G11c 7/00

[58] Field of Search.... 340/173 RC, 173 R, 173 FF, 340/174 AC, 174 GA, 174 TB; 307/238

[56] References Cited

UNITED STATES PATENTS

| | | | |
|---|---|---|---|
| 3,008,129 | 11/1961 | Katz | 340/174 AC |
| 3,311,893 | 3/1967 | Landell | 340/174 R |
| 3,423,737 | 1/1969 | Harper | 340/173 R |
| 2,876,352 | 3/1959 | Schneider | 340/173 RC |
| 3,504,350 | 3/1970 | Stone | 340/173 FF |
| 3,413,618 | 11/1968 | Shuba | 340/173 RC |

*Primary Examiner*—Stanley M. Urynowicz, Jr.
*Attorney, Agent, or Firm*—William J. Dick

[57] ABSTRACT

A circuit is described to suppress or inhibit the driving of bipolar transistors in a memory cell or cells into saturation when a like instruction is already stored in the storage cell or cells. Suppression is accomplished by comparing the information stored in the storage cell with the information applied to the input of the cell, whereby writing is permitted to proceed if the information is not identical and inhibited such if the information is identical.

10 Claims, 3 Drawing Figures

WRITE SUPPRESSION IN BIPOLAR TRANSISTOR MEMORY CELLS

SUMMARY OF THE INVENTION AND STATE OF THE PRIOR ART

The present invention relates to write suppression in memory storage cells, and more particularly relates to a circuit for automatic write suppression for storage in memory cells comprised of bipolar transistors.

The design of memory storage cells having bipolar transistors is well-known. Circuit design such that during the writing the transistors are prevented from being driven into saturation is also known. Conventionally, a storage cell circuit includes anti-saturation diodes and associated resistors. Not only is it difficult to insert additional diodes and resistors in integrated circuits, at state of the art high-packaging densities such an arrangement has limitations inasmuch as special storage cell circuits are required and it is difficult, if not impossible, to install such circuitry in existing, bipolar transistor memory cells.

In the book "Digitale Rechenanlagen," by A. P. Speiser, pages 44 and 45, circuit arrangements with logic circuits which inhibit or provide signals for application to the input of the circuit as a function of the storage signal, is known. In the event that the stored state corresponds to the signal applied to the input, the input signal is inhibited so that it is not applied to the cell. Alternately, if the storage signal and the signal applied to the input differ the inhibit switch is controlled by the storage circuit by way of feedback such that the signal applied to the input is permitted to pass to the succeeding circuitry. However, such logic circuit elements which prevent storage cells having bipolar transistors do not illustrate how to prevent such bipolar transistors in a memory cell from being driven into saturation.

In view of the above, it is a principal object of the present invention to provide an automatic write suppression circuit for use in integrated matrix storage cells wherein the storage cells comprise bipolar transistors.

Another object of the present invention is to provide a circuit, as set forth above, which is located externally of the storage cell circuit and which may be utilized simultaneously for a plurality of storage cells without modifying existing storage cell circuits.

Another object of the present invention is to provide a circuit for automatic write suppression wherein no input is applied to a bipolar transistor memory cell when the store in the cell is the same as the store intended at the input to the cell.

Still another object of the present invention is to provide a novel circuit arrangement which immediately inhibits the input signal after the cell has been switched to prevent the transistors in the storage cell from being driven into further saturation.

Yet another object of the present invention is to provide a novel circuit for use in conjunction with bipolar transistor storage cells in which, if the cell contents correspond to the information to be written, no write operation is initiated thereby shortening the write time of the matrix storage and reducing the average power dissipation and heating.

Other objects and a more complete understanding of the invention may be had by referring to the following specification and claims taken in conjunction with the accompanying drawings in which:

Figure 1:
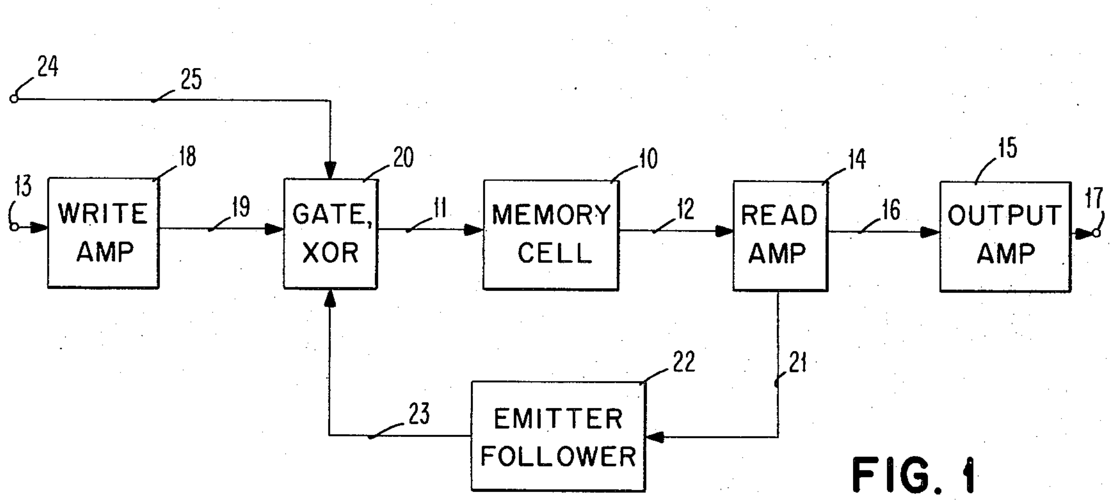
FIG. 1 is a block diagram of the circuit of the present invention.

Referring now to the drawings, and especially FIG. 1 thereof, a memory or bistable storage cell 10 having an input and output, 11 and 12 respectively, is illustrated with associated functional blocks to suppress information applied to the input of the storage cell when the data to be applied to the input terminal 13 is the same as the stored data. For purposes of illustration, only one storage or memory cell 10 is illustrated, however depending upon the organization of the storage array in which the automatic write storage cell is used, all word lines or bit lines or separate cells may comprise read/-write amplifiers and write gate circuitry.

In accordance with the invention, comparing means or logic means are provided to compare the information stored in the memory or storage cell 10 with the input information desired to be written in the cell so that writing may proceed if the information is not equal to that which is already in the cell while inhibiting such information if such information is already in the cell. To this end, the output side of storage cell 10 is connected to a read amplifier 14 and an output amplifier 15 is connected to the read amplifier as through line 16 thus providing data output 17. The input signal to the memory cell of the information to be written is through a write amplifier 18 which is connected as through line 19 to comparing means, in the present instance a combination gate and exclusive OR circuitry 20. Functionally the gate and exclusive OR circuitry could be replaced by a gate and separate exclusive OR functional blocks. As will be explained hereinafter, a sampling of the information contained in the storage cell 10 is fed back from the read amplifier 14 to the gate and exclusive OR circuitry 20, in the illustrated instance through lines 21, an emitter follower 22 and line 23, to provide a comparison of the information in the cell with the information intended to be written into the cell at data input terminal 13. Additionally, in order to write either a zero or a one, which is applied to input terminal 13, a write instruction has to be applied to terminal 24.

In operation the write or instruction signal is fed via line 25 into the gate and exclusive OR circuit 20 as is the information to be written transferred by way of the write amplifier 18, from input terminal 13, via line 19 into the gate and exclusive OR circuit 20. If the information stored in the storage cell 10 is identical (either a one or a zero) to the information applied to data input terminal 13 there will be no output signal from the gate 20 on line 11 and thus no input signal to the memory or storage cell 10. Thus the gate and exclusive OR circuitry associated with functional block 20 inhibits the application of additional current to the memory or storage cell thereby preventing saturation of the bipolar transistors in the cell. Alternately if the information on line 19 to the gate and exclusive OR circuitry 20 and the information on line 23 are not equal, then a signal is generated through line 11 to the memory or storage cell 10 causing an inversion or change of state of the information in the memory cell 10. Immediately upon the memory cell 10 changing state, the feedback information on line 23 into the gate 20 will reverse, thereby cutting off the signal on the input line 11 thus preventing the transistors of storage cell 10 from being driven into saturation.

Thus writing is terminated when the contents of memory storage cell 10 correspond to the information applied to input terminal 13 thereby preventing the bipolar transistors of storage cell 10 from being driven into saturation.

Figure 2:
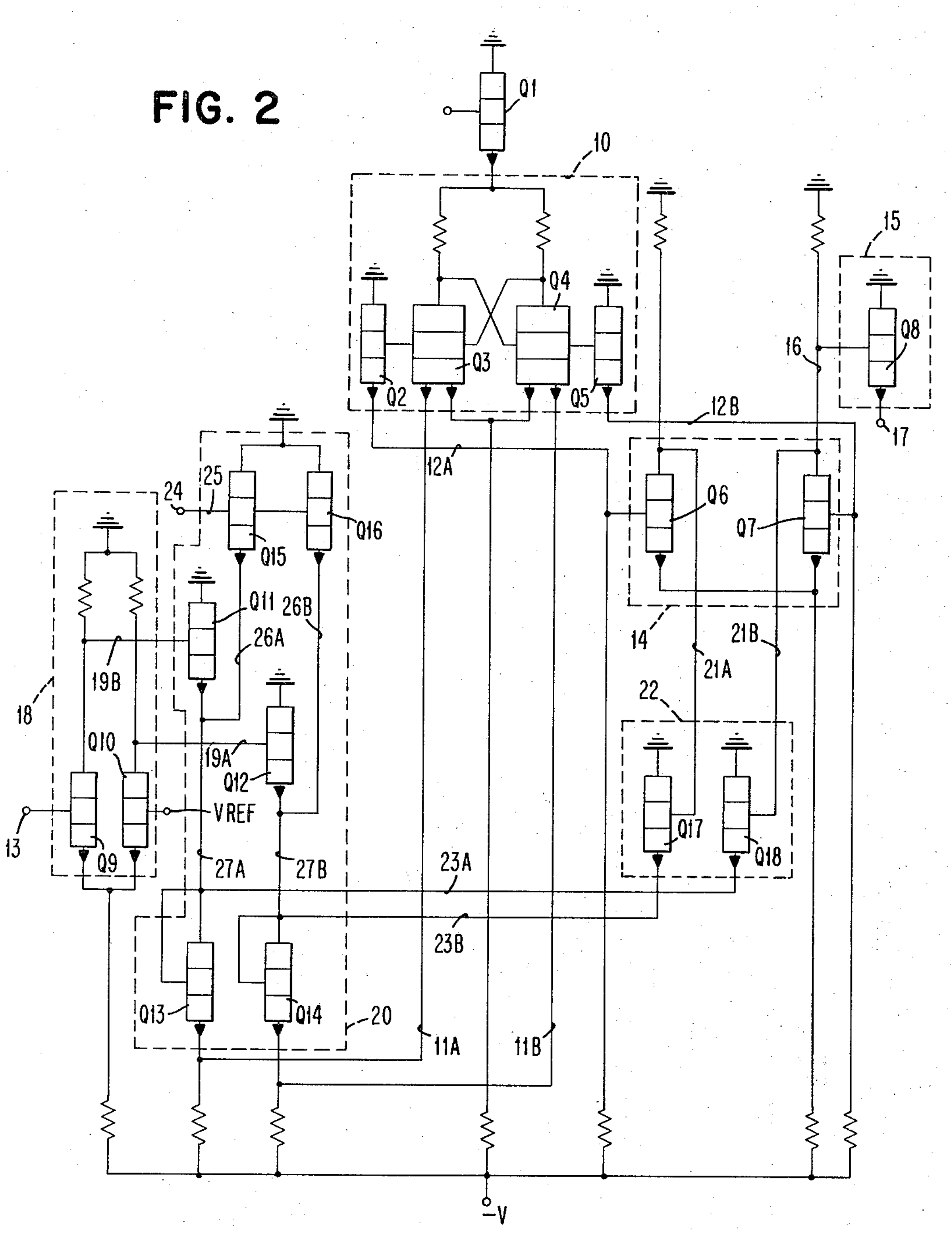
FIG. 2 is a schematic diagram of a circuit constructed in accordance with the present invention and as diagrammatically shown in FIG. 1.

The circuitry of the functional block diagram illustrated in FIG. 1 is more fully shown in FIG. 2. The memory or storage cell 10 (FIG. 1) illustrated in FIG. 2 comprises a pair of double emitter bipolar transistors Q3 and Q4 which are cross-coupled with the inner emitters thereof being interconnected. Read transistors Q2 and Q5 are connected respectively to the double emitter transistors Q3 and Q4, the emitter of transistors Q2 and Q5 being coupled respectively to the base of transistors Q6 and Q7 which form the read amplifier, in the illustrated instance a differential amplifier functionally block 14 in FIG. 1. To facilitate identification of lines or leads for proper association between FIGS. 1 and 2, suffix lettering is utilized. In this connection, the line pair 12A and 12B comprise the functional line 12 shown in FIG. 1. The read amplifier composed of transistors Q6 and Q7 form a current switch which operates through line 16 with the output amplifier 15, an emitter follower transistor Q8, providing a data output at output terminal 17. As illustrated, the base of transistor Q8, whose emitter forms the data output 17 of the circuit, is connected to the collector of transistor Q7 of the read amplifier 14.

The write amplifier 18 also is formed as a current switch comprising transistors Q9 and Q10 and receives, from the data input terminal 13, the information for writing a one or zero into the memory cell 10. The output from the write amplifier 18 comprises line pair 19A and 19B. The write instruction terminal 24 is connected through lead 25 to a pair of write enable transistors Q15 and Q16 which are connected as emitter followers through lines 26A and 26B to the emitters of emitter follower transistors Q11 and Q12, the bases of which are connected to the write amplifier 18. The emitters of transistors Q11 and Q12 are also connected through lines 27A and 27B respectively to transistors Q13 and Q14, the base and collector of which are shorted thereby causing transistors Q13 and Q14 to operate as diodes. In a manner which will be more fully explained hereinafter, transistors Q11, Q12, Q13, Q14, Q15 and Q16 operate as the gate and exclusive OR functional block 20 illustrated in FIG. 1.

The output of the gate and exclusive OR circuitry 20 is taken through line pair 11A and 11B (comprising the line 11 of FIG. 1) and coupled to the outboard emitters of transistors Q3 and Q4. In a like manner the feedback loop is taken from the collectors of transistors Q6 and Q7 (read amplifier 14) through leads 21A and 21B and directly coupled to the bases of transistors Q17 and Q18 (emitter follower 22). The output of the emitter follower is taken from the bases of transistors Q17 and Q18 through line pair 23A and 23B respectively to the base-collector of transistors Q13 and Q14.

In order to trace through the operation of the circuitry in FIG. 2 it is assumed that transistor Q4 is conducting and that with Q4 conducting, zero is stored in the cell 10. With transistor Q4 conducting its base will be up causing the collector of transistor Q3 to be up and its base down. Inasmuch as read transistor Q2 is coupled through its emitter to the base of transistor Q6 in the read amplifier 14, the base of Q6 will be down causing the collector to be up and thus the base and emitter of transistor Q17 to be up. Additionally, the emitter of read transistor Q5 will be up causing the collector of transistor Q7 to be down and thus the output terminal 17 to be down inasmuch as the output amplifier 15 transistor Q8 is an emitter follower. Because the collector of transistor Q7 is down the base and emitter of Q18 will be down. Thus the signal on line 23A will be down, while the signal on line 23B will be up.

In order to write information into the memory cell, the instruction at the instruction terminal 24 must be down so as to reduce conduction through transistors Q15 and Q16 and thus place the emitters of Q11 and Q12 in the down condition. As may be seen, if the input terminal 24 is up, the transistors Q15 and Q16 form a shunt path and effectively short circuit transistors Q11 and Q12.

For the first set of conditions, assume that it is desired to change the state of the memory or storage cell 10 to cause transistor Q4 to stop conducting and transistor Q3 to commence conducting (i.e. a stored 1). If an up signal is presented to data inlet terminal 13, the base of transistor Q11 is down and therefore the emitter of Q11 is down. This matches the input to the collector-base of transistor Q13 presented on line 23A and therefore minimizes conduction through transistor (operating as a diode) Q13. Alternatively the collector of Q10 goes up, causing transistor Q12 to conduct, thus matching the input to the collector-base of transistor Q14 (acting as a diode) and permits these transistors to conduct. Inasmuch as transistors Q12 and Q14 are in shunt with transistor Q4, current does not flow through the outboard emitter of transistor Q4. Simultaneously, the current through transistors Q11 and Q13 which is in parallel with transistor Q3 or storage cell is effectively reduced, thereby causing current to flow in the outboard emitter of transistor Q3 and causing the cell 10 to switch state. When this occurs, the data output at output terminal 17 goes up inasmuch as the base of transistor Q7 goes down. Following this action the input to the base-collectors of transistors Q13 and Q14 on lines 23A and 23B reverses, line 23A going up while line 23B goes down. In this manner, further driving signal which would result in saturation of transistor Q3 in storage cell 10 is prevented. Thus even after a change of state, the feedback loop prevents the memory cell 10 from being driven, thus preventing saturation.

Alternatively, and assuming that transistor Q4 in storage cell 10 is conducting and, therefore, the output is down, if there is an attempt to write a zero into transistor Q9 at inlet terminal 13, transistor Q9's collector will rise causing the base of transistor Q11 and emitter to rise. However, while the emitter of Q11 attempts to go up, the signal on line 23A is down and conduction will continue through transistors Q11 and Q13. Alternately inasmuch as the collector-base of transistor Q14 is biased up, but transistor Q12 reduces conduction because more current is flowing through transistor Q10, transistor Q4 in memory storage cell 10 will continue to conduct and no additional current will tend to drive that transistor into saturation.

Figure 3:
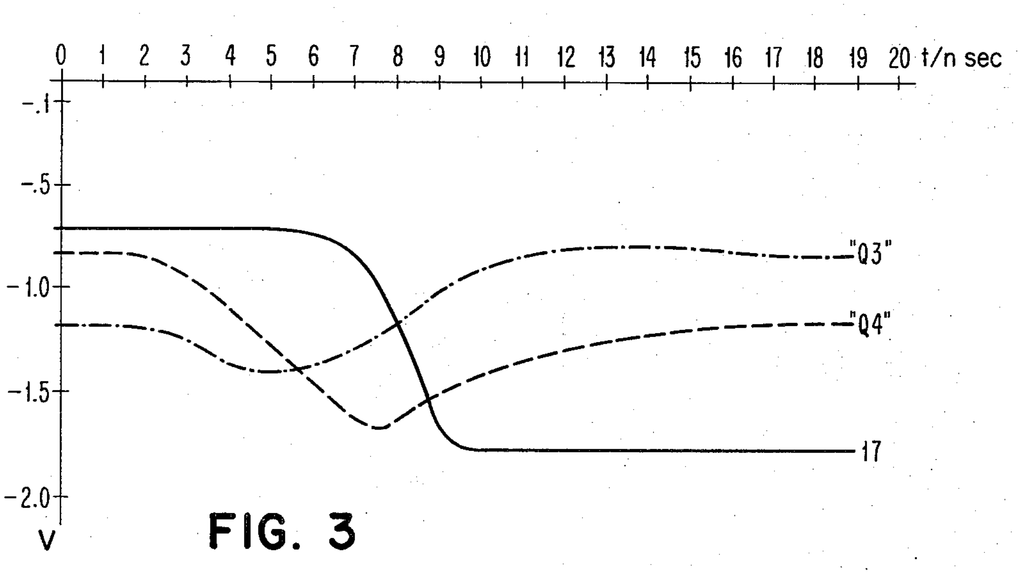
FIG. 3 is a typical voltage/time diagram illustrating the operation of the circuit illustrated in FIG. 2.

FIG. 3 shows voltage conditions which occur during the write operation of the circuit illustrated in FIG. 2, and illustrates the write suppression feature in a graph of voltages versus time. The line designated "Q3" is the voltage at the collector of transistor Q3 while the dash line labeled "Q4" is the collector voltage appearing at the collector of transistor Q4. The solid line indicates the condition of the output at any time *t*.

Thus the described circuit for automatic write suppression offers two important technical advantages for read/write memory arrays where the storage cells comprise bipolar transistors. The writing of information applied to the input of one storage cell is terminated immediately after the storage cell is switched, thus preventing the storage cell from being driven into saturation; while if the cell contents correspond to the information to be written, no write operation is initiated, so that the write time of a matrix storage cell is shortened and the average power dissipation, and thus heating, is reduced.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A bistable storage cell comprised of semiconductor transistors for storing data representative of binary information and having an input connection to the cell and an output connection from the cell, said semiconductor transistors capable of being driven into saturation; logic means connected to said cell and responsive to the binary state of said cell, said logic means including an exclusive OR circuit; means connected to said cell for writing said data into said cell, said logic means inhibiting the writing of information into said cell when said cell state and the data to be written are representative of the same binary information, and including means in said logic means to immediately inhibit further writing into said cell upon said cell switching states whereby further saturation of said cell is prevented.

2. A bistable storage cell comprised of bipolar transistors for storing data representative of binary information said bipolar transistors being capable of being driven into saturation; logic means connected to said cell and responsive to the binary state of said cell, said logic means including an exclusive OR circuit; and means in said logic means to inhibit the writing of data into said cell when said cell state and the data to be written are representative of the same binary information, and means in said logic means to inhibit further writing of data into said cell when said cell switches states whereby further saturation of said cell is prevented.

3. A circuit for write suppression in at least one monolithic semiconductor storage cell in which storage is accomplished in a bistable environment; said storage cell including an input and an output, read amplifier means connected to said output, and data output means connected to said read amplifier means; gating and comparing means responsive to the output signal of said cell and to a signal to be written into said cell; means for feeding said signal at the output of said cell into said gating and comparing means, said gating and comparing means including an exclusive OR circuit, said gating and comparing means gating said signal to be written into said cell when said output signal and said signal to be written into said cell differ, and inhibiting the writing in of said signal when said signals are the same whereby further saturation of said semiconductor storage cell is prevented.

4. A circuit for write suppression in accordance with claim 1 including means for applying a write instruction to said gating and comparing means whereby said gating and comparing means is able to receive said signal to be written and said output signal.

5. A circuit for write suppression in accordance with claim 4 including a write amplifier, means connecting said write amplifier to said gating and comparing means, and means for applying said input signal to said write amplifier.

6. A circuit for write suppression in at least one monolithic semiconductor storage cell in which storage is accomplished in a bistable environment, said storage cell including an input and an output, and comprising a pair of double-emitter bipolar transistors, said input being connected to one emitter of each of said pair of transistors, and said output being connected to the emitters of a pair of read transistors whose bases are coupled to respective bases of said double emitter transistors; gating and comparing means responsive to the output signal of said cell and to a signal to be written into said cell; said gating and comparing means comprising a pair of emitter follower transistors coupled through the emitters each to one junction of a pair of diodes, and means coupling the other junction of said diodes to the input of said storage cell; said gating and comparing means gating said signal to be written into said cell when said output signal and said signal to be written into said cell differ, and inhibiting the writing in of said signal when said signals are the same whereby further saturation of said storage cell is prevented.

7. A circuit for write suppression in accordance with claim 6 wherein said diodes comprise transistors having their base and collectors shorted together, said means coupling said storage cell to said diodes being connected to the emitters of said diode connected transistors.

8. A circuit for write suppression in accordance with claim 7 wherein said storage cell output is connected to said one junction of said diodes.

9. A circuit for write suppression in accordance with claim 8 including a pair of emitter follower transistors connected to said storage cell output and said one junction of said diodes, intermediate said cell output and said one junction of said diodes.

10. A circuit for write suppression in accordance with claim 9 including a read amplifier intermediate said emitter follower transistors and said storage cell.

* * * * *